(12) United States Patent
Gomes Antunes et al.

(10) Patent No.: US 12,223,860 B2
(45) Date of Patent: Feb. 11, 2025

(54) LABEL FOR IDENTIFYING AN OBJECT, A PRECURSOR OF THE LABEL, A METHOD OF READING THE LABEL, AND A METHOD OF MANUFACTURING THE LABEL

(71) Applicant: UN1QNX, Braga (PT)

(72) Inventors: Amândio Xavier Gomes Antunes, Braga (PT); Ana Eduarda Silva, Gamil (PT); António Augusto Magalhães da Cunha, Braga (PT); Guilherme Augusto Borges Pereira, Braga (PT); Ricardo Figueiredo de Sá, Gamil (PT); Tania Cristina De Abreu Braga, Braga (PT)

(73) Assignee: UN1QNX, Braga (PT)

( * ) Notice: Subject to any disclaimer, the term of this patent is extended or adjusted under 35 U.S.C. 154(b) by 78 days.

(21) Appl. No.: 17/772,121

(22) PCT Filed: Oct. 30, 2019

(86) PCT No.: PCT/EP2019/079637
§ 371 (c)(1),
(2) Date: Apr. 26, 2022

(87) PCT Pub. No.: WO2021/083504
PCT Pub. Date: May 6, 2021

(65) Prior Publication Data
US 2022/0406224 A1 Dec. 22, 2022

(30) Foreign Application Priority Data
Oct. 28, 2019 (PT) .......................... 115866

(51) Int. Cl.
*G06K 19/06* (2006.01)
*B05D 7/00* (2006.01)
(Continued)

(52) U.S. Cl.
CPC ........... *G09F 3/0297* (2013.01); *B05D 7/546* (2013.01); *G09F 2003/0257* (2013.01)

(58) Field of Classification Search
CPC ........ B42D 25/00; B42D 25/41; B42D 25/29; B42D 25/435; B42D 25/45; B42D 25/305; B41M 3/14; B41M 5/267; G06K 19/06037
See application file for complete search history.

(56) References Cited

U.S. PATENT DOCUMENTS 3,897,964 A * 8/1975 Oka ...................... G06K 19/083
358/1.9
4,523,777 A * 6/1985 Holbein ................. B42D 25/00
283/67
(Continued)

FOREIGN PATENT DOCUMENTS

EP 19797258 3/2024

*Primary Examiner* — Shin H Kim
(74) *Attorney, Agent, or Firm* — Woods Patent Law, P.C.

(57) ABSTRACT

The invention relates to a label (30) for identifying an object, the label comprising a plurality of layers ($L_1$, $L_2$, $L_3$), wherein each layer comprises a matrix material (15), and each layer comprises a plurality of identifier elements (10, 11); the plurality of identifier elements (10, 11) are dispersed in the matrix material (15), and the plurality of layers (L) are arranged so that at least two layers at least partially overlap each other. Further, the invention relates to a precursor of a label (30) for identifying an object and a method of manufacturing a label (30) for identifying an object.

23 Claims, 6 Drawing Sheets

(51) Int. Cl.
*B42D 15/00* (2006.01)
*G06C 11/00* (2006.01)
*G09F 3/00* (2006.01)
*G09F 3/02* (2006.01)

(56) References Cited

U.S. PATENT DOCUMENTS

| | | | | |
|---|---|---|---|---|
| 4,766,026 A | * | 8/1988 | Lass | G06K 19/06046 347/262 |
| 5,298,922 A | * | 3/1994 | Merkle | B41M 3/14 347/262 |
| 6,584,214 B1 | * | 6/2003 | Pappu | G07D 7/121 382/206 |
| 6,954,293 B2 | * | 10/2005 | Heckenkamp | G06K 19/083 359/566 |
| 7,223,512 B2 | * | 5/2007 | Lutz | B42D 25/41 430/944 |
| 7,380,128 B2 | * | 5/2008 | Bourrieres | G06K 19/06 713/185 |
| 7,513,433 B2 | * | 4/2009 | Kreuter | G06K 19/06 430/21 |
| 7,793,846 B2 | * | 9/2010 | Jones | B41M 5/46 235/494 |
| 7,927,685 B2 | * | 4/2011 | LaBrec | C08K 3/16 524/413 |
| 8,469,282 B2 | * | 6/2013 | Freeman | G06K 19/0614 235/487 |
| 8,528,941 B2 | * | 9/2013 | Dorfler | B42D 25/351 283/85 |
| 8,875,628 B2 | * | 11/2014 | Depta | B41J 2/442 101/170 |
| 8,927,094 B2 | * | 1/2015 | Sugai | B41M 7/0081 427/256 |
| 8,936,846 B2 | * | 1/2015 | Depta | B42D 25/435 430/10 |
| 8,985,471 B2 | * | 3/2015 | Freeman | B42D 25/00 235/487 |
| 9,010,638 B2 | * | 4/2015 | Moran | G06K 7/10821 235/440 |
| 9,082,062 B2 | * | 7/2015 | Sharma | G06K 19/06037 |
| 9,340,059 B2 | * | 5/2016 | Haas | B41M 5/267 |
| 9,731,539 B2 | * | 8/2017 | Lister | G03C 5/08 |
| 10,373,407 B2 | * | 8/2019 | Simons | B42D 25/23 |
| 2005/0116463 A1 | * | 6/2005 | Kreuter | G06K 19/06 283/67 |
| 2007/0023494 A1 | * | 2/2007 | Haraszti | G11B 20/00884 235/12 |
| 2015/0248603 A1 | * | 9/2015 | Lowenthal | G06K 19/086 235/491 |
| 2023/0043690 A1 | * | 2/2023 | Spivack | G06K 7/1417 |

* cited by examiner

LABEL FOR IDENTIFYING AN OBJECT, A PRECURSOR OF THE LABEL, A METHOD OF READING THE LABEL, AND A METHOD OF MANUFACTURING THE LABEL

RELATED APPLICATION

This application is a national stage entry of, and claims priority and other benefits from: (a) International Patent Application PCT/EP2019/079637 to Gomes Atunes et al. filed on Oct. 30, 2019, entitled "A label for identifying an object, a precursor of the label, a method of reading the label, and a method of manufacturing the label" (hereafter "the '079637 patent application"), and (b) Provisional Portuguese Patent Application No. 115866 to Gomes Antunes et al. filed on Oct. 28, 2019 entitled "A label for identifying an object, a precursor of the label, a method of reading the label, and a method of manufacturing the label." The entirety of the '079637 patent application is hereby incorporated by reference herein.

TECHNICAL FIELD

The present invention relates to a label for identifying an object, a precursor of a label for identifying an object, a method of reading the label and a method of manufacturing the label.

TECHNICAL BACKGROUND

There are various types of labels known in the field of identifying objects, such as packaging, pharmaceuticals, and Official Documents. One aspect of such known labels is that an object can be identified, and that information of the object is provided which is used to authenticate that the identified object is genuine. Another aspect of such known labels is that the labels need to have a counterfeit proof.

Known labels have various shapes, comprise different elements and use different identification devices. Most labels have in common that the labels comprise one layer made of a material with a specific structure. The specific structure may be a texture, a surface structure or elements in a translucent material. In addition, elements can be randomly distributed in the translucent material of a label comprising only one layer. Such a label is disclosed in U.S. Pat. No. 7,380,128 B2. This label is made of a transparent material and an assortment of bubbles. Another example of a known label is one that contains a non-translucent material with a special surface structure, for example small bumps. Known labels can further comprise surface structures due to possible bigger particles in the layer that protrude from the layer (e.g. bubbles or spheres) or indentations in the surface of the material (e.g. cracks). Commonly, such known labels are used in connection with a further printed label, such as a Quick Response Code and an identification number, for example.

A disadvantage of such common labels is the relative low level of complexity and, thus, the reduced counterfeit protection. The term complexity is understood to encompass multiple complex patterns that are difficult to understand or to recognize and which lack simplicity. Moreover, a complex pattern is understood in the following as a pattern which composes complicated structures of multiple elements, wherein the elements interact in multiples ways and are disorganized. In certain areas, the complicated structures can overlap and can form intertwined and twisted structures in three dimensions. When a label is complex, it is harder to duplicate. Thus, a complex label can increase the counterfeit protection.

Hence, there remains a need for a label with an enhanced level of complexity and an improved counterfeit safety. In addition, there is a need for a precursor, a manufacturing method and a reading method of such a label.

SUMMARY OF THE INVENTION

Accordingly, it is an object of the present invention to provide a label with an enhanced level of complexity and an improved counterfeit safety and a precursor of such a label. Moreover, it is a further object of the present invention to provide a manufacturing method of such a label. Further, the present invention aims to provide a method of reading such a label.

These objects are achieved by a label with the technical features of claim 1, a method of reading the label with the technical features of claim 9, a precursor with the technical features of claim 10, and a method of manufacturing a label with the technical features of claim 12. The dependent claims define optional features and preferred embodiments.

The present invention provides, in a first aspect, a label for identifying an object, the label comprising a plurality of layers, wherein each layer comprises a matrix material, and each layer comprises a plurality of identifier elements. The plurality of identifier elements are dispersed in the matrix material, and the plurality of layers are arranged so that at least two layers at least partially overlap each other.

The present invention allows to combine and arrange a plurality of layers in one label, each layer comprising a plurality of dispersed identifier elements and a matrix material, so as to provide a label that has an improved complexity and an enhanced counterfeit safety. In particular, due to the provision of a plurality of layers, a more complex label is formed. In addition, in each layer of the plurality of layers, there is a freedom of arranging identifier elements independently from another layer or other layers. This freely choosable arrangement of the identifier elements in each layer helps to increase the complexity of the label. Due to the at least partial overlapping of at least two layers of the plurality of layers, an enhanced level of complexity is achieved which results in a label with an improved counterfeit safety, due to the spatial combination of the arrangement of the identifier elements.

Hence, the present invention provides a more complex label with an improved counterfeit safety.

The level of complexity can be controlled by suitably choosing the number of layers of the plurality of layers. The level of protection of the label can be adapted by the number of the plurality of layers including the identifier elements. For example, a higher number of layers results in a more complex label.

One layer may comprise a plurality of identifier elements. Some layer may comprise a plurality of identifier elements. The at least two layers which at least partially overlap each other may comprise a plurality of identifier elements. Each of the plurality of layers or all layers of the plurality of layers may comprise a plurality of identifier elements. In at least two layers of the plurality of layers the number of the plurality of identifier elements may be the same or the number of the plurality of identifier elements may be different. In one layer of the plurality of layers one of the identifier elements may be different from the other identifier elements. In some layers of the plurality of layers one of the identifier elements may be different from the other identifier elements. In all layers of the plurality of layers one of the identifier elements may be different from the other identifier elements. In one layer of the plurality of layers at least some of the identifier elements may be different from each other. In some layers of the plurality of layers at least some of the identifier elements may be different from each other. In all layers of the plurality of layers at least some of the identifier elements may be different from each other. The identifier elements may be different in size, shape, geometries, material, color and/or properties. The identifier elements may be the same/identical in terms of size, shape, geometries, material, color and/or properties.

In a second aspect of the present invention, the plurality of layers may be at least two layers, or at least three layers. Optionally, the plurality of layers may comprise at least or exactly four, at least or exactly five, at least or exactly six, at least or exactly seven, at least or exactly eight, at least or exactly nine, or at least or exactly ten layers. In particular, the plurality of layers may comprise twenty layers or more than ten and less than twenty layers. With a higher number of the layers, the complexity of the label is improved.

The plurality of layers are arranged so that at least two layers partially overlap each other. The at least two layers may overlap from 10% to 100% of the extent of one layer. The at least two layers may overlap to at least or exactly 10%, at least or exactly 20%, at least or exactly 30%, at least or exactly 40%, at least or exactly 50%, at least or exactly 60%, at least or exactly 70%, at least or exactly 80%, at least or exactly 90%, or at least or exactly 100% of the extend of one layer each other. Preferred, the at least two layers may overlap 100% of the extend of one layer each other. At least two layers may completely overlap each other so that the two layers are congruent.

An overlapping direction of the label is the direction in which the plurality of layers of the label do at least partially overlap. The overlapping direction is the direction in or along which the plurality of layers are arranged, e.g. stacked or laminated, on top of each other in a region/area of at least partial overlap.

The layers of the plurality of layers may extend in a direction that is perpendicular to the overlapping direction, which may be a radial direction of the label. The radial direction is the direction that is perpendicular to the overlapping direction. Additionally, the radial direction extends along the longest extend of at least one layer of the plurality of layers in one direction.

According to a third aspect of the present invention, the plurality of layers may be located on top of each other.

At least one layer of the plurality of layers is covered by another layer of the plurality of layers to 50% of the extend of the one layer to be defined to be on top of each other. On top of each other may means that the at least two layers of the plurality of layers are arranged in such a way so as to overlap each other completely, e.g. overlap 100% of the extend of one layer. This means that at least one layer of the plurality of may be completely covered by another layer of the plurality of layers. At least one layer of the plurality of layers may be congruent with another layer of the plurality of layers to be on top of each other. Moreover, if the plurality of layers are located on top of each other, a more complex label is formed.

All layers of the plurality of layers may have the same shape. One layer of the plurality of layers may have a different shape than the remaining layers of the plurality of layers. Some layers of the plurality of layers may have a different shape than the other layers of the plurality of layers. Each layer of the plurality of layers may have a different shape. A layer of the plurality of layers may have a shape, such as a circular, polygonal, rectangular, hexagonal, triangular shape in a top view, i.e. in a cross-section along a plane perpendicular to the overlapping direction. A layer of the plurality of layers may have an irregular shape, such as a non-polygonal shape, e.g. a boomerang shape, or a polygonal shape, e.g. a convex or non-convex shape in a top view, i.e. in a cross-section along a plane perpendicular to the overlapping direction.

All layers of the plurality of layers may have the same size. One layer of the plurality of layers may have a different size than the remaining layers of the plurality of layers. Some layers of the plurality of layers may have a different size than the other layers of the plurality of the layers. Each layer of the plurality of layers may have a different size. The size of a layer is measured in the radial direction, i.e. the direction perpendicular to the overlapping direction of each layer. The size of a layer may be a diameter.

The plurality of layers may be arranged so that at least or exactly three layers, at least or exactly four layers, at least or exactly five layers, at least or exactly six layers, at least seven layers, at least or exactly eight layers, at least or exactly nine layers or at least or exactly ten layers at least partially overlap each other. Any number of layers can partially overlap each other to an extend of 10% to 100% of one layer, with the range as described above.

The at least three layers can overlap each other not in the same area. Two layers of the at least three layers can partially overlap each other in a first area and the one layer of the two layers may overlap with the at least third layer in a second area, wherein the first area is not the second area or wherein the first area is the same as the second area. The plurality of layers may be laminated in an area. All layers of the plurality of layers may be laminated.

Preferably, all layers of the plurality of layers overlap to 100% of the extend of one layer. Each layer of the plurality of layers may be congruent to the other layers of the plurality of layers.

Moreover, the complexity can be controlled by arranging at least two of the plurality of layers in the label so that the at least two layers of the plurality of layers at least partially overlap each other. Moreover, the complexity can be controlled by the amount or degree of overlapping of at least two layers of the plurality of layers.

In a fourth aspect of the present invention, at least one overlapping layer is transparent for electromagnetic waves, in particular for visible light and/or for x-rays.

Some overlapping layers of the plurality of layers may be transparent for electromagnetic waves, in particular for visible light and/or for x-rays. The at least two overlapping layers may be transparent for electromagnetic waves, in particular for visible light and/or for x-rays. Preferentially, the uppermost layer in the overlapping direction of the plurality of layers may be transparent for electromagnetic waves, in particular for visible light and/or for x-rays. Preferably, all layers of the plurality of layers may be transparent for electromagnetic waves, in particular for visible light and/or for x-rays. All layers of the plurality of layers may be transparent for electromagnetic waves, in particular for visible light and/or for x-rays, in the overlapping direction of the label. The electromagnetic waves may be fluorescence or phosphorescence. The electromagnetic waves may have wavelengths in a range between 380 nm and 780 nm.

The matrix material of at least one layer of the plurality of layers may be transparent, translucent or opaque in a solid state. The matrix material of some layers of the plurality of layers may be transparent, translucent or opaque in a solid state. The matrix material of all layers of the plurality of layers may be transparent, translucent or opaque in a solid state. The matrix material of at least one layer of the plurality of layers may have a color. Preferably, the matrix material of all layers of the plurality of layers may be transparent. The material of the matrix material may be the same for some layers of the plurality of layers. All layers of the plurality of layers may have the same material of the matrix material. Moreover, the matrix material may be solidified or cured. Any suitable material may be selected so that the matrix material can be cured or solidified. The material of the matrix material may be rigid. The material of the matrix material may be flexible. The material of the matrix material may have a high strength, a high abrasion resistivity, and a high stability against environmental influences and/or wear. The material of the matrix material may be a polymer, a resin, or a wax. The material of the matrix material may be a thermosetting polymer, a thermosetting resin, or thermosetting plastic. The material of the matrix material may be a polyurethane, epoxy resin or UV casting resins.

The matrix material may hold the plurality of identifier elements in their relative positions. Moreover, the matrix material may ensure the stability of the label through various conditions and wear. The matrix material preserves the complex structures of the identifier elements, so that the label can be formed of complex layers.

Due to the transparency of at least one overlapping layer for electromagnetic waves, the complex pattern of the label is visible. The transparency of at least the uppermost layer in the overlapping direction of the plurality of layers allows that the complexity of the label is visible. Moreover, through the transparency of at least one overlapping layer for electromagnetic waves, the complex structures of the identifier elements in the plurality of layers can be determined. Through the transparency of all layers of the plurality of layers for electromagnetic waves, the complex structures of the identifier elements in the plurality of layers can be determined. Due to the transparency of at least one layer for electromagnetic waves, in particular visible light, the naked eye or e.g. a simple camera, can read the complex label. Thus, the complexity of the label can be read or recognized by a simple process.

In a fifth aspect of the present invention, at least one layer of the plurality of layers may comprise first identifier elements and the matrix material and another layer of the plurality of layers may comprise second identifier elements and the matrix material, wherein the first identifier elements are different from the second identifier elements. Some layers of the plurality of layers may comprise first identifier elements and the matrix material and another layer of the plurality of layers may comprise second identifier elements and the matrix material. At least one layer of the plurality of layers may comprise first identifier elements and the matrix material and second identifier elements and the matrix material. Some layers of the plurality of layers may comprise first identifier elements and the matrix material and second identifier elements and the matrix material.

The first identifier elements may be the same as the second identifier elements. The first identifier elements may be different from the second identifier elements in size, shape, geometry, material, color, and/or properties. Each identifier element of the plurality of identifier elements may have a different color.

If the first identifier elements are different from the second identifier elements, a more complex pattern of the label can be formed.

In a sixth aspect of the present invention, the first identifier elements may have a different size than the second identifier elements, in particular the first identifier elements may extend in a direction that is perpendicular to an overlapping direction over a larger distance than the second identifier elements.

An effect of the differences in size between the first identifier elements and the second identifier elements is that a more complex pattern of the label can be formed.

The first identifier elements may be solid elements and the second identifier elements may be solid elements. The first identifier elements may be solidified liquid elements. The second identifier elements may be solid elements. The first identifier elements may have a different volume than the second identifier elements, in particular the volume of the first identifier elements may extend in a direction that is perpendicular to an overlapping direction over a larger distance than the volume of the second identifier elements.

The plurality of identifier elements may be a plurality of solid elements and/or liquid elements. The identifier elements may be visible in the matrix material.

In the finished label the liquid elements, comprised in the matrix material, may not be in a liquid state. Some liquid elements may be contained in a cavity of the matrix materials as fluid inclusions. Some liquid elements may be contained in the cavity of the matrix material in a liquid state.

The liquid elements may comprise a plurality of pigments or small particles. In particular, particles or pigments may have a color which differs from the matrix material. The solidified liquid elements may have undefined boundaries with faded contours. The liquid elements may form color streaks or smudges of color in the matrix material. Preferred liquid elements may be solidified ink or a colored liquid. The perimeter of the liquid elements may be in the range from 1 mm to 60 mm, preferably in the range from 1 mm to 10 mm.

The advantage of the liquid elements is to develop a more complex structure due to the random distribution of the identifier elements in a layer, resulting in a more complex label. The color effects of the liquid elements in the matrix material may result in more complex layers and may enhance the level of complexity in the label.

The solid elements may be mixed with the matrix material so that a surface of the solid elements may be in connection and/or in direct contact with the matrix material. The solid elements may be bonded to the matrix material by chemical functional groups. Preferably, the solid elements are preserved in the matrix material.

The solid elements may have different shapes, geometries, sizes, materials, properties and/or colors. The solid elements may be calibrated or uncalibrated particles. The solid elements may have shapes such as spheres, polyhedrons, pyramids, cubes, non-polyhedron or any other irregular or regular shape. The solid elements may be metals, polymers, glass, residues, glitter, or graphite. The solid elements may have a diameter in the range from 1 nm to 10 mm, preferably in the range from 10 nm to 5 mm.

The solid elements of the identifier elements, which are dispersed in the matrix material, may have the effect that the identifiability of the complex pattern is increase. The form or structure of the identifier elements is more concrete visible in the complex label.

In a seventh aspect of the present invention, the label may further comprise a substrate supporting the plurality of layers. The substrate may be a foil, a polymer, or a metal. The material of the substrate may be a self-adhesive vinyl, a paper, a corrugated cardboard, a polymeric film, wood, a natural laminated film or a digital printing film. The substrate may be attached or glued to a surface of the object. As an alternative, the substrate may be a portion/part of the object. Furthermore, the label may be directly formed on the object or the object's surface to protect the object or the object's surface in the area in which the label is formed on. The matrix material may preserve the surface of the object or the complex pattern of the object's surface on which the label may be formed on. The substrate may increase the hardness, stability and/or rigidity of the label. The substrate may have a thickness in the range from 20 μm to 3000 μm in the overlapping direction of the label.

The effect of the substrate is to support the complex label due to an increased stability of the substrate.

A substrate may comprise at least one of a character element. A character element may be any one of a serial number, tag, a number code, a bar code, text, an image, an object or a quick response code or any other known identification element for identifying the type of label. The character element may be a focus target or calibrated target. The effect of the character element may that the label as such is recognized. Additionally, the character element may be used to recognize the label during the reading process.

In an eighth aspect of the present invention, at least one layer of the plurality of layers differs from at least another layer of the plurality of layers in the number of identifier elements per unit volume of the matrix material. Some layers of the plurality of layers differ from the other layers of the plurality of layers in the number of identifier elements per unit volume of the matrix material. Each layer of the plurality of layers differs from at least another layer of the plurality of layers in the number of identifier elements per unit volume of the matrix material.

The liquid elements may not be uniformly or homogenously distributed within the matrix material. The liquid elements may be inhomogeneously dispersed in the matrix material. Optionally, the liquid elements may be dispersed in the matrix material with a variation in number of liquid elements per unit of matrix material. Optionally the concentration of the liquid elements in the matrix material may vary. The solid elements of the identifier elements may be inhomogeneously dispersed in the matrix material.

The number of the identifier elements per unit volume of the matrix material may vary less in one layer than between two layers that are arranged on top of each other. The number of the identifier elements per unit volume of the matrix material may vary less in some layers of the plurality of layers than in the other layers of the plurality of layers. The number of the identifier elements per unit volume of the matrix material may vary in at least one layer of the plurality of layers.

Due to the difference in number of identifier elements per unit volume of the matrix material, a more complex label is formed.

The layers of the label may be distinguished from each other by the plurality of identifier elements, optionally at least by the number of identifier elements per layer, by the number of identifier elements per unit volume of the matrix material, by the color of the identifier elements per layer, by the size of the identifier elements per layer, by the volume of identifier elements per unit volume of matrix material, or by the shape of the identifier elements per layer.

In a ninth aspect of the present invention, a method for reading the label is provided, the method may comprise reading the label at a first level, and reading the label at a second level, wherein the second level is below the first level in the overlapping direction of the label.

The method may further comprise reading the label at a third level, wherein the third level is below the first level in the overlapping direction and above the second level in the overlapping direction. The method may further comprise reading the label at a fourth level, wherein the fourth level is below the first level in the overlapping direction and above the second level in the overlapping direction, and above or below the third level in the overlapping direction.

The first level of the label may be a first focusing plane, e.g. for focusing visible light, electromagnetic waves or infrared light. The second level of the label may be a second focusing plane, e.g. for focusing visible light, electromagnetic waves, or infrared light. The third level of the label may be a third focusing plane, e.g. for focusing visible light, electromagnetic waves or infrared light. The fourth level of the label may be a fourth focusing plane, e.g. for focusing visible light, electromagnetic waves or infrared light.

The first level of the label may be the uppermost layer of the plurality of layers of the label in the overlapping direction. The second level of the label may be the lowermost layer of the plurality of layers in the overlapping direction. The first level of the label may be a first focus target or calibrated target. The second level of the label may be a second focus target or calibrated target. The first level of the label may be focused for a first digital image. The second level of the label may be focused for a second digital image. The third level of the label may be focused for a third digital image. The fourth level of the label may be focused for a fourth digital image. Alternatively, the method of reading the label may comprise reading the label at a first point, and reading the label at a second point, wherein the second point is below the first point in the overlapping direction of the label and the second point is translated in the radial direction of the label compared to the first point.

The effect associated with the reading of the label at least at two levels of the label is that the complex label can be read. Due to the at least two levels of the label the complex pattern of the label can be scanned or read in three dimensions. It is an effect of the reading of at least two levels in the complex label that the counterfeit security is increased. By reading at least two level of the label instead of one level of the label, the counterfeit security is increased. Moreover, the complex label can be read without adapting the direction or angle of a reading device with respect to the label.

A further feature of the label may be a reference element that may extend in at least one dimension. The reference elements may extend across at least two layers of the plurality of layers of the label. The reference element may at least extend between two layers of the plurality of layers, or may extend along more than two layers, or optionally may cross all layers of the plurality of layers. The reference element may be arranged in the matrix material of a layer of the plurality of layers and may extend in the radial direction of the layer. Optionally, at least one reference element of the label may extend in at least one direction, in the radial direction or in the overlapping direction. As the at least one reference element may extend into at least one dimension, the reference element may cover some identifier elements when viewed in the overlapping direction and/or radial direction and/or any angle between the overlapping direction and the radial direction. The reference element may have a perimeter of 1 mm to 60 mm. Due to this special arrangement, the reference element may create occluded areas, when the finished label is viewed from multiple angles and distances and the complex label is readable.

Furthermore, the label may be used and attached in multiple ways. All kind of known objects may be used to attach the label, optionally an object may be a product. Objects may be any one of a shipment, container, pallet, carton, package/box, item, bottle, product, label of a product or price tag, etc. The label may further be attached or applied to a package or a product. The label may be integrally formed within a product. Depending on the size, form or shape of the object, the label may be designed in a certain shape or with a certain color pattern or arrangement of identifier elements in the matrix material.

The label of the present invention allows the verification of authenticity of an object across all transit points in the value chains of the object, e.g. from the production line to the final user of the object. Due to the complexity of the distribution of the identifier elements and the plurality of layers, the label of the present invention has an improved counterfeit safety. The label of the present invention is unique and complex at least due to the dispersed identifier elements and, thus, unclonable.

The label may have multiple forms or shapes and may be attached or embedded to objects, e.g. containers, packages, products, ID/bank cards, etc. Further applications of the label of the present invention may be bank notes, credit cards, electronic payment systems, communication systems, jewelry and collectables, packaging, electronic components and systems, retail goods (e.g., handbags, clothing), industrial components and systems, food products and packaging (e.g. wines, spirits, cans), pharmaceuticals, pharmaceutical packaging and lots, medical devices and surgical tools, Official Documents (e.g., contracts, passports, visas), digital storage systems and elements, mail and postal packaging, seals and tamper-proof labels. Thus, the label of the present invention may be formed in multiple forms and shapes. The aesthetic and durability of the label may be adequately selected to be physically present in the object for the object's entire lifecycle. Furthermore, the label may preserve the object's surface (irregular surface) over the entire lifecycle of the object.

The thickness of the label is determined along the overlapping direction. The thickness of the label is the length in which the label extends along the overlapping direction. The average thickness is the thickness of the label that is determined at multiple areas of the label along the thickness direction.

The thickness of the label or the average thickness of the label may be between 0.1 mm and 5 mm. The thickness or average thickness of the label may preferentially be between 0.5 mm and 2.5 mm. The thickness or average thickness of the finished label may be at least or exactly 0.5 mm, at least or exactly 0.6 mm, at least or exactly 0.7 mm, at least or exactly 0.8 mm, at least or exactly 0.9 mm, at least or exactly 1.0 mm, at least or exactly 1.1 mm, at least or exactly 1.2 mm, at least or exactly 1.3 mm, at least or exactly 1.4 mm, at least or exactly 1.5 mm, at least or exactly 1.6 mm, at least or exactly 1.7 mm, at least or exactly 1.8 mm, at least or exactly 1.9 mm, at least or exactly 2.0 mm, at least or exactly 2.1 mm, at least or exactly 2.2 mm, at least or exactly 2.3 mm, at least or exactly 2.4 mm, at least or exactly 2.5 mm. The label may have a uniform thickness. The thickness of the label may vary in some areas of the label in the direction parallel to the overlapping direction.

The label may have a variable length in the radial direction, i.e. in a direction perpendicular to the overlapping direction. The label may have a diameter in the range between 0.5 mm and 100 mm. Preferably the diameter of the label may be 20 mm.

Due to the small size of the label, the complex label can be used in multiple ways and can be applied to various objects in different sizes.

Each layer of the plurality of layers may comprise at least one irregular surface. Optionally one layer may comprise an irregular surface. The layers of the label may have a smooth and/or flat and/or even surface. At least one layer of the plurality of layers may comprise indentations of a texture of a natural surface (e.g. wood, metal, textile). Optionally, at least one layer of the plurality of layer may have indentations, projections, protrusions or irregular negative structures (i.e. structures that locally increase or decrease the thickness of a layer of the plurality of layers in the overlapping direction).

The thickness of a layer of the plurality of layers or the average thickness of a layer of the plurality of layers may be between 0.01 mm and 0.05 mm. Preferably, the thickness or average thickness of a layer may be between 0.5 mm and 2.5 mm. The thickness or average thickness of a layer of the plurality of layers may be at least or exactly 0.5 mm, at least or exactly 0.6 mm, at least or exactly 0.7 mm, at least or exactly 0.8 mm, at least or exactly 0.9 mm, at least or exactly 1.0 mm, at least or exactly 1.1 mm, at least or exactly 1.2 mm, at least or exactly 1.3 mm, at least or exactly 1.4 mm, at least or exactly 1.5 mm, at least or exactly 1.6 mm, at least or exactly 1.7 mm, at least or exactly 1.8 mm, at least or exactly 1.9 mm, at least or exactly 2.0 mm, at least or exactly 2.1 mm, at least or exactly 2.2 mm, at least or exactly 2.3 mm, at least or exactly 2.4 mm, at least or exactly 2.5 mm. Each layer of the plurality of layers may have a uniform thickness. A layer of the plurality of layers may have a uniform thickness. The thickness of a layer may vary in the direction parallel to the overlapping direction. Due to the wide variety of the layers, complex structures can be formed which enhances the complexity of each layer.

The size of the identifier elements is the diameter or perimeter of the identifier elements. The diameter of the identifier elements may be in the range between 0.000001 mm and 30 mm. The perimeter of the identifier elements may be in the range between 1 nm and 60 mm.

The size of the identifier elements may be determined by measuring the contour of the identifier elements.

The volume of the identifier elements may vary in the range between 0.1 mm$^3$ and 1 cm$^3$.

Optionally, every layer of the plurality of layers of the label may be formed in the same shape. Some layers of the plurality of layers may have a different shape than the other layers of the plurality of layers. One layer of the plurality of layers may have a different shape than the other layers of the plurality of layers. Each layer of the plurality of layers may have the same shape. A shape of a layer of the plurality of layers may be any one of an irregular, a non-polygonal, a circular, a half circular, star-shaped, flower-shaped, a polygonal, such as rectangular, square-shaped, triangular, hexagonal shape, drop-shaped, and any combination thereof. By shape of the layers, a more complex label can be formed.

The material of identifier elements and of the matrix material may be selected so that a contrast is always provided at the boundary between the identifier elements and the matrix material. The boundary between the identifier elements and the matrix material may be a sharp transition. The contrast between the identifier elements and the matrix material may be provided by a suitable color scheme of the identifier elements and the matrix material (e.g. complimentary color or colors with a high contrast). The provision of a contrast between each of the identifier elements and the matrix material results in an enhanced validation process of the label. In addition, the pattern of the complex label may be better visualized in the digital image. In some embodiments, the contrast between the solidified liquid elements and the matrix material may be a broad transition zone due to the mixture between the solidified liquid elements and the matrix material.

Optionally, the shape of the identifier elements and the colors of the identifier elements may be customized to resemble a certain branding or scheme.

Optionally, track and trace capabilities may be incorporated in the label to provide a further individuality to the label. A track and trace element in the label may be a radio-frequency identification, a marker or a barcode. Due to track and trace capabilities in the label, it is possible to recognize and identify the label, and/or report the position of a label during the life cycle of the object.

An intermediate layer between two layers of the plurality of layers of the label may be a permanent liquid layer. If the label is slightly or partly or completely removed from the object, the liquid of the permanent liquid layer may leak from the label, so that the permanent liquid layer is changed or emptied. By this leaking of the liquid from the label, a further tamper proof is provided. If the liquid has leaked from the label, a validation of the label may be no longer possible.

Optionally, the label may further comprise tamper proof elements to eliminate the possibility of transferring an original label to a counterfeit product. At least one layer of the plurality of layers may be arranged to at least partially overlap at least another layer and may adhere to the other layer. Some layers of the plurality of layers may be arranged to at least partially overlap each other and may adhere to each other. All layers of the plurality of layers may be arranged to at least partially overlap each other and all layers of the plurality of layers may adhere to each other. Adhere means that the layers can only be mechanically separated from another by breaking or destroying the label.

In the label at least two focal point marks or focal level marks may be engraved. A first focal point mark or focal level mark may be in a first level of the label. Another second focal point mark or focal level mark may be in a second level of the label. The second level of the label may be below the first level of the label in the overlapping direction of the label. The at least two focal point marks or focal level marks result in an improved reading process for the complex label, as the focus points or focus levels may be always recognized.

The materials of the label may be selected in such a way to ensure that the label is long-lasting. Optionally, the materials of the labels may be selected so as to last as long as the object on which the label is attached to or applied to.

A tenth aspect of the present invention is the provision of a precursor of a label for identifying an object, the precursor comprising a plurality of layers, wherein each layer comprises a matrix material, and each layer comprises a plurality of identifier elements. In each layer, the plurality of identifier elements are dispersed in the matrix material. In at least one layer, the matrix material is in a non-solid state, in particular a liquid state, so that the identifier elements are moveable within the matrix material.

The precursor of the invention can be used as a precursor of the label of the invention. Thus, the same features, characteristics and properties described above for the label of the invention also apply to the precursor of the invention.

The precursor of the invention provides the same technical effects and advantages already described in detail above for the label of the invention. In particular, the precursor enables the formation of the complex label.

The precursor may comprise a plurality of layers, wherein each layer may comprise a matrix material, and some layers of the plurality of layers may comprise a plurality of identifier elements. The precursor may comprise a plurality of layers, wherein the plurality of layers may be at least two layers, or at least three layers. In at least one layer of the plurality of layer of the precursor, the matrix material may be in a solid state, in particular a non-liquid state, so that the identifier elements may not move within the matrix material. In some layers of the plurality of layer of the precursor, the matrix material may be in a solid state, in particular a non-liquid state, so that the identifier elements may not move within the matrix material. In at least some layers of the plurality of layers of the precursor, the matrix material may be in a solid state, so that the plurality of identifier elements may no longer freely move within the matrix material. The plurality of layers of the precursor may be arranged so that at least two layers at least partially overlap each other. The partial overlap of the plurality of layers of the precursor may be in the range as defined above for the label of the present invention.

In at least some layers of the plurality of layers of the precursor, the plurality of identifier elements may be dispersed in the matrix material. In at least one layer of the plurality of layers of the precursor, the matrix material may be in a non-solid state, so that the identifier elements are freely moveable within the matrix material and may be able to disperse. The non-solid state of the matrix material is a state in which the matrix material is liquid. The non-solid state of the matrix material is a state where the matrix material has not been solidified. The plurality of identifier elements may freely move within the non-solid matrix material and may move in every direction and/or may rotate. The chaotic movement of the identifier elements in the non-solid matrix material of the precursor may be due to Brownian motion, gravitational forces, or centrifugal forces. The plurality of identifier elements may randomly distribute in the non-solid matrix material of the precursor due to forces that act on at least one of the identifier elements.

The plurality of identifier elements in the non-solid matrix material of the precursor may freely and randomly move. The plurality of identifier elements may translate or rotate in the matrix material of the precursor that is in a non-solid state. The plurality of identifier elements of the precursor may not react or completely dissolve in the matrix material.

Due to the chaotic movement of the plurality of identifier elements in the non-solid matrix material a complex pattern in at least one layer of the plurality of layers of the precursor is formed. Thus, due to the complex pattern of the plurality of layers, a complex label may be formed.

The plurality of identifier elements of the precursor may be enclosed by the matrix material, e.g. completely surrounded by the matrix material. At least some of the identifier elements of the precursor may extend from the matrix material and may thus not completely surrounded by the matrix material. At least one identifier element of the plurality of identifier elements of the precursor may extend from the matrix material and may thus not completely surrounded by the matrix material.

As every layer of the plurality of layers of the precursor may comprise the freely distributed identifier elements and the matrix material, a complex precursor of a label may be formed. A further effect of the precursor of the present invention is that each precursor has a complex pattern, as the identifier elements may be randomly and freely dispersed in at least one layer the plurality of layers. Thus, the precursor has an increased counterfeit safety.

In an eleventh aspect of the present invention, at least one layer of the plurality of layers of the precursor may comprise first identifier elements and the matrix material and another layer of the plurality of layers of the precursor may comprise second identifier elements and the matrix material, wherein the first identifier elements may be different from the second identifier elements.

Some layers of the plurality of layers of the precursor may comprise first identifier elements and the matrix material and the other layers of the plurality of layers of the precursor may comprise second identifier elements and the matrix material. At least one layer of the plurality of layers of the precursor may comprise first identifier elements and the non-solid matrix material and second identifier elements and the non-solid matrix material. Some layers of the plurality of layers of the precursor may comprise first identifier elements and the non-solid matrix material and second identifier elements and the non-solid matrix material.

The first identifier elements of the precursor may be different from the second identifier elements of the precursor in size, volume, shape, geometry, material, color, and/or properties. Each identifier element of the plurality of identifier elements of the precursor may have a different color. The first identifier elements of the precursor may be the first identifier elements of the label. The second identifier elements of the precursor may be the second identifier elements of the label.

The first identifier elements of the precursor may be liquid elements and the second identifier elements of the precursor may be solid elements. Alternatively, the first identifier elements of the precursor may be solid elements and the second identifier elements of the precursor may be liquid elements. The liquid elements and/or the solid elements may freely distribute in the non-solid matrix material of the precursor.

The solid elements may not change their shapes. The solid elements may freely move in the non-solid matrix material. The solid elements may rotate or translate in every dimension in the non-solid matrix material. The solid elements may be randomly distributed in the non-solid elements due to Brownian motion, gravitational forces, or centrifugal forces. The solid elements may be oriented randomly relative to each other. The solid elements may rotate around an axis that is parallel the overlapping direction and/or around an axis that is parallel to the radial direction. The solid elements may change position in the non-solid matrix material and/or the solid elements may change their relative rotational arrangement to each other. The solid elements may not chemically react with the matrix material, beside the adhesive connection or structural connection between the surface of the solid elements and the matrix material. The solid elements may not move in the solid matrix material and may freely move in the non-solid matrix material.

The liquid elements may change position in the non-solid matrix material and/or the liquid elements may change their relative rotational arrangement to each other. The liquid elements may be oriented randomly relative to each other. The liquid elements may change their shapes. The liquid elements may change their shapes from a drop shape or sphere shape to an irregular polyhedron shape, e.g. a cylinder shape, or a non-polyhedron shape. The liquid elements may mix with the non-solid matrix material. The liquid elements may form with the non-solid matrix material a solution or emulsion. The liquid elements may disperse in the non-solid matrix material so that the liquid elements may have undefined boundaries with faded contours. The liquid elements may not be completely dissolved in the non-solid matrix material and thus may form small aggregates such as bubbles which are trapped in or enclosed by the matrix material. The liquid elements may disperse in the non-solid matrix material so that the liquid elements may form color smears, color streaks, or flowmarks in the non-solid liquid matrix material. The liquid elements may be ink. The ink may dissolve in the matrix material in different concentrations. The liquid elements may randomly disperse in the non-solid matrix material due to Brownian motion, gravitational forces, or centrifugal forces. The liquid elements may freely move in the non-solid matrix material. The liquid elements may mix and/or interact with the non-solid matrix material so that the volume of the liquid elements increase.

The liquid elements may solidify with the solidification the matrix material. The liquid elements may be a solidified liquid in the solid matrix material. The liquid elements may solidify with the matrix material together simultaneously. The liquid elements may freely disperse in the non-solid matrix material. The liquid elements may not move in the solid matrix material.

According to this precursor the identifier elements may be randomly dispersed in the non-solid state of the matrix material of each layer so as to form a complex and unique pattern. This may be associated with the effect that a more complex label is formed from the complex precursor.

The precursor of a label may be an intermediate product of the label during the manufacturing process. The precursor may be characterized that some layers of the plurality of layers of the precursor comprise a solid matrix material and at least one layer of the plurality of layers comprise a non-solid matrix material. Thus, the plurality of identifier elements of the precursor in at least one layer with the non-solid matrix material may freely and randomly distribute. Due to the random and free dispersion of the plurality of identifier elements in at least one layer of the plurality of layers of the precursor with the non-solid matrix material, the plurality of identifier elements can form a complex pattern. The precursor of a label may be transformed into a label by solidifying the matrix material of all layers of the plurality of layers of the precursor. By solidifying all layers of the precursor, the movement of the plurality of identifier elements may be stopped. A precursor may be distinguished from a label in that the precursor comprise at least one layer of the plurality of layers which comprises the matrix material in a non-solid state.

A twelfth aspect of the present invention is a method of manufacturing a label for identifying an object, the label comprising a plurality of layers, wherein the method comprises providing at least a first mixture and a second mixture, wherein the first mixture and the second mixture each comprise a non-solid matrix material, in particular a liquid state, the first mixture comprises a plurality of identifier elements, and the second mixture comprises a plurality of identifier elements, wherein, in each mixture, the plurality of identifier elements are dispersed in the non-solid matrix material, solidifying the matrix material of the first mixture so as to form a first layer of the label, and solidifying the matrix material of the second mixture so as to form a second layer of the label.

The manufacturing method of the invention may be used for manufacturing the label of the invention. The same features, characteristics and properties described above for the label of the invention and for the precursor of the invention also apply to the manufacturing method of the invention.

The method of the invention provides the same technical effects and advantages already described in detail above for the label of the invention and for the precursor of the invention. In particular, the method of manufacturing a label enables the formation of the complex label.

The solidifying of the matrix material may be performed by a chemical reaction in the matrix material between two material components of the material of the matrix material. The solidifying of the matrix material may be performed by a chemical reaction in the matrix material itself. The solidifying of the matrix material may be performed by applying an external stimulus to the non-solid matrix material, e.g. temperature or UV-light. The solidifying or curing of the matrix material may be performed by applying a predetermined temperature. The solidifying or curing of the matrix material may be performed by cooling or heating.

By this method of the twelfth aspect, a more complex label can be formed. Due to the non-solid state of the matrix material, the identifier elements can freely move and/or distribute within the non-solid matrix material, as describe above for the precursor of the present invention. The solidifying of the non-solid matrix material results in a capture or entrapment of the identifier elements in a complex pattern. This results in the complex layer and, hence, in a complex label.

A thirteenth aspect of the method of the present invention may be that the first layer and the second layer are arranged so that they at least partially overlap each other. Due to this overlapping of the layers, a highly complex label may be formed.

In a fourteenth aspect of the method of the present invention, the solidifying of the matrix material of the first mixture and the solidifying of the matrix material of the second mixture may be performed one after the other.

The solidifying of the matrix material of the second mixture may be after the solidifying of the matrix material of the first mixture. Thus, the first layer of the first mixture and the second layer of the second mixture may be formed after the other.

In a fifteenth aspect of the method of the present invention, the matrix material of the second mixture may be solidified when the second mixture is arranged so as to at least partially overlap with the solidified first layer. The partial overlapping may range between 10% and 100% of the extent of each layer of the plurality layers. The partial overlap of the plurality of layers may be in the range as defined above for the label of the present invention.

In a sixteenth aspect of the method of the present invention, the method may further comprise arranging the first mixture and the second mixture at least partially on top of each other, wherein the matrix material of at least one mixture is in a non-solid state, in particular a liquid state. The first mixture and the second mixture may be arranged on top of each other, wherein the matrix material of at least one mixture is in a non-solid state, in particular a liquid state. The effect associated with the arrangement of the first mixture on top of the second arrangement is that the manufacturing method is simplified, as the second mixture can be solidified on the first layer. This method step of solidifying the second mixture when the second mixture is arranged of the first mixtures may be favored when the matrix material solidifies in a short time period.

In a seventeenth aspect of the method of the present invention, the method may further comprise arranging the first layer and the second layer at least partially on top of each other, wherein at least the first mixture of the first layer and the second mixture of the second layer are in a solidified state. An effect associated with the separate solidifying of the first layer and the second layer may be a faster manufacturing process, as the first layer and the second layer can be solidified at the same time or before the second layer is arranged on top of the first layer.

The plurality of layers can be formed by either forming each of the plurality of layers of the label on top of each other so that at least two layers partially overlap each other, or by forming each layer of the plurality of layers separately and then arranging the at least two layers of the plurality of layers partially on top of each other.

Due to this method, the complex label is manufactured by forming the layers separately and arranging the layers at least partially on top of each other or by forming layers on top of each other. In addition, the overlapping arrangements of the layers result in a more complex label.

Thus, a first method may be the solidifying of the mixture to form the first layer of the plurality of layers and then arranging the second mixture on top of the first layer of the plurality of layers, which results in a precursor as described above. Following the steps may be performed of solidifying the second mixture on top of the first layer to form a second layer. A second method may be the solidifying of the first mixture to form a first layer and solidifying the second mixture to form a second layer separately before the second layer is arranged on the first layer so that the second layer at least partially overlaps the first layer. An effect associated with the method of manufacturing a label is a simplified manufacturing process.

The method of manufacturing a label may further comprise the step of forming the plurality of layers on a substrate. Optionally, the substrate may have a natural surface, e.g. wood, metal, polymer, or texture. Optionally, the natural surface may comprise an irregular surface. If an irregular surface may be used to apply the label directly during the manufacturing process, the label may have an irregular surface. Optionally, the label may be formed directly on the object. The object may have a wood surface, a metal surface, a polymer surface, a textured paper surface or a surface with a texture, with the surface being the surface on which the label may be formed. Optionally, the natural surface of the object may comprise an irregular surface. The irregular surface of the object may form a texture in at least one layer of the plurality of layers of the label. The irregular surface of the object may form a texture as a negative of the irregular surface of the object in at least one layer of the plurality of layers of the label. The irregular texture of the object in the at least one layer of the plurality of layers of the label may form a further complex pattern which increases the complexity of the label and improves the counterfeit safety.

Optionally, at least one reference element which extends at least in one dimension may be placed in the mixture of the first layer. Thereby, the reference element may extend from at least one surface of the layer. When the second mixture may be placed on top of the first layer, the extending reference element is included/covered by the second mixture of another layer. Thus, in the finished layer at least one reference element may extend through at least two layers of the plurality of layers. Thus, the more complex label can be manufactured.

The present disclosure further provides a reading process, e.g. validation or authentication process, of the label of the present invention. The validation process may comprise reading the complex pattern of the label by a validation device or reading device and producing at least two control digital images, comparing the control digital image to the original digital images stored in the database, and evaluating the authenticity of the label.

A method of identifying the label for an object of the present disclosure may comprise the steps of scanning the label by a validation device to produce an original digital image; recognizing the unique pattern of the plurality of layers of the scanned original digital image of the label (digital image which needs to be saved to be later identified); storing the data of the complex pattern of a plurality of layers in a database; connecting and entering additional data referring to an object to the data of the complex pattern of a plurality of layers in the database, with the object being the object where the label is applied to; scanning the label on the object by a validation device to produce a control digital image; computing the similarity of the scanned control digital image (e.g. complex pattern of a plurality of layers) with the original digital images stored in the database; identifying a similar/identical image based on a match of the scanned control digital image of a label with the original digital image stored in the database; receiving data, which is connected to the complex pattern of a plurality of layers, from the database; identifying the object with the received data of the database.

The validation method may further comprise identifying the label by at least two digital images of the label of the original digital image and the control digital image. The original and control digital images may comprise two or more digital images of the label, wherein each digital image may be acquired under different conditions. A first condition for the acquiring of the digital image may be from at least two different angles or directions of the label, with the one angle/direction being dissimilar to another angle/direction. A second condition for the acquiring of the digital image may be different focal distances of the optical device from the label.

Alternatively, the at least two digital images of the original and control digital image may be read at least at two different focal points or focal levels within the plurality of layers of the label, as described above. All elements at the first focal point/level may be clear and focused in the first image. In the second image, all elements at the second focal point/level may be clear and focused. The validation may be done by comparing which elements are focused in each digital image. Optionally, the digital images may comprise further digital images than two digital images of the label. Preferably, the digital image may be divided into a grid. The focal point marks or focal level marks, as described above for the label, can be used to read the label so that the label may always be read at the same point or level.

The reference object in the label may occlude some identifier elements. By the missing or visibility of some identifier elements through the occlusion of the reference element, the complex pattern of the label may be validated more easily during the validation process. The irregular surface of the object or the object's surface may form a further complex pattern in at least one layer of the plurality of layers of the label, which may be additionally read by the validation device during the validation process.

The reading process may be performed by a validation device. The process of validation by the validation device may be based on digital image processing, which may be performed with a known smartphone image acquisition. The validation may be performed by a validation device, e.g. means such as a known smartphone and/or any known high-speed camera with a connection to a database. The validation may be performed by means such as a high-resolution dedicated camera. By the use of a high-resolution dedicated camera the quality of the reading process and validation process may be higher than the quality of a smartphone or a common camera.

The validation process may be performed by a validation device such as an optical device, optionally an infrared device or fluorescence device or x-ray device. The optical device may be a camera, a photo, a known smartphone with at least one camera, a high speed camera or a dedicated device. The dedicated device may be for reading and for validating the label.

A validation device may further comprise a validation software. Optionally, a validation software may be provided to be used by any known validation device. The validation software may be configured to compute the differences between the original digital image and the control digital image. The validation software may divide the label in the digital images into a grid and classifies each element of the grid according to the level of relevance for the validation. Regions of the label that contain less identifier elements might weight less in the validation calculation. Regions that contain multiple identifier elements, optionally the reference element, may be considered more relevant in the validation calculation and are mandatory for a successful validation.

The validation process may be repeated for multiple digital images, which are read in the original digital image and/or in the control digital image. Hence, the validation process can be performed multiple times to read or validate the complex label.

The overall validation process of the label may comprise manufacturing the label, reading the manufactured label through a first original image by a validation device, storing the data of the first original image in a database, attaching or providing the label on an object, reading the label by a validation software to verify the authenticity, preferably additional information in connection with the object might be stored in the database, reading the label on an object in a control digital image by the validation device to authenticate the object, optionally further data beside that the label is an original label might be presented to a user. The database may have a remote access and may be protected. Additionally, the validation device may have a user assisting tool to indicate to the user where the place the camera relative to the label. The image acquisition may be performed automatically or manually.

BRIEF DESCRIPTION OF THE DRAWINGS

Hereinafter, non-limiting examples of the invention are explained with reference to the drawings, in which.

DETAILED DESCRIPTION OF PREFERRED EMBODIMENTS

Hereafter, some aspects of the present disclosure are described. Single features of the following embodiments or modifications thereof may be combined with features of other embodiments or modifications so as to form further embodiments.

Figure 1:
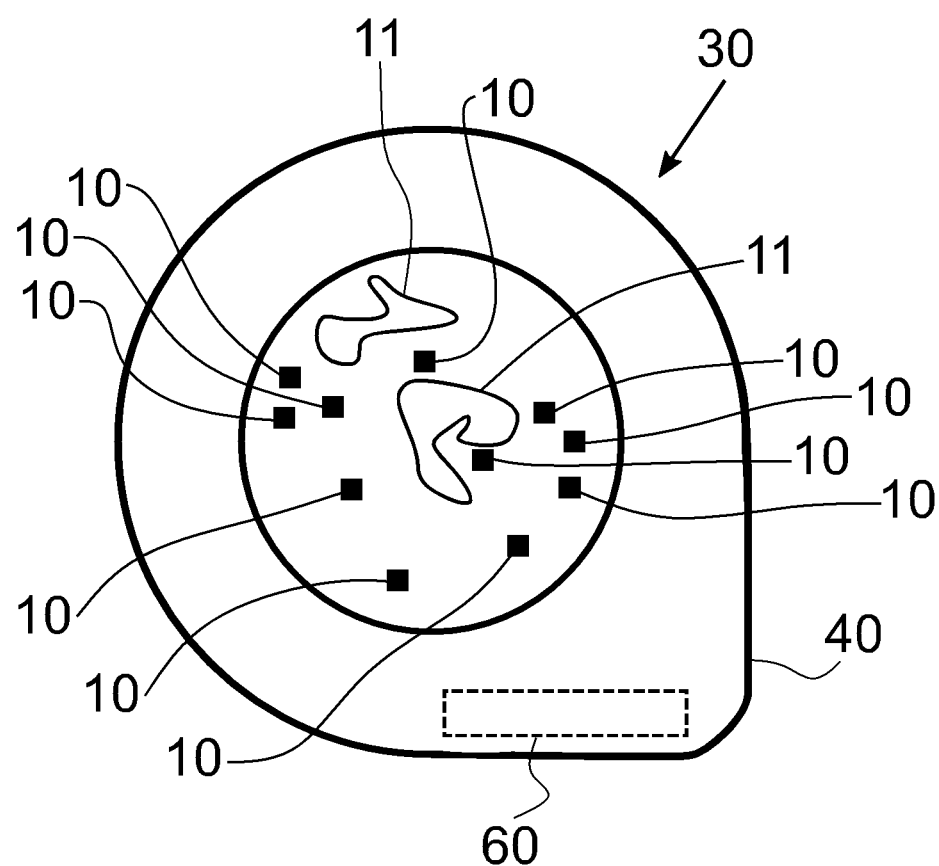
FIG. 1 shows a label according to a first embodiment of the present invention, when viewed in the overlapping direction of the plurality of layers.

FIG. 1 shows a label 30 of a first embodiment of the present invention. The label 30 of the first embodiment comprises a plurality of layers, wherein each layer comprises a matrix material 15 and identifier elements 10, 11, a substrate 40, and a character element 60. Optionally, the label 30 can further comprise no substrate 40 and no character element 60. The substrate 40 has a surface 40, e.g. a surface of a foil, on which the character element 60 is printed. Alternatively, the label can be formed on the irregular surface of the object, so that the irregular surface of the object is traced or forms marks or a complex pattern in at least one layer of the plurality of layers of the label (not shown). The character element 60 can be a number or a text, in particular a serial number 60, for identifying the label. The first type of the identifier elements 10 are solid elements which have a cubic shape, are made of a metal or polymer, and are chaotically distributed in the matrix material. The second type of the identifier elements 11 are inhomogeneously distributed in the matrix material 15. The identifier elements 11 are ink or ink drops or ink aggregates which have been solidified by the matrix material. The identifier elements 11 form within the matrix material a colored streak or color smear. The matrix material is a polymer which can be cured or solidified at room temperature. The matrix material could also be a resin, wax or polymer that is cured or solidified through UV light or at high temperatures or pressures. The lowermost layer of the plurality of layers in the overlapping direction comprises the first type of the identifier elements 10, wherein the uppermost layer of the plurality of layers in the overlapping direction comprises the second type of the identifier elements 11. The two layers of the label 30 are arranged on top of each other so that the two layers overlap each other completely. The label of the first embodiment can be validated by reading the label at least in two focal levels or focal points and by additionally reading the character element 60, in particular a serial number or a logo, by the use of a validation device. Validation device can read the label 30 at the two focal levels or two focal points and can provide a control digital image. With the aid of the character element 60, the original digital image of the label 30 can be selected from the database. In an additional step, the similarity of the original digital image with the control digital image is calculated. If there is a match between the original digital image and the control digital image, the label 30 can be identified. However, the validation process can be performed without the use the character element 60. When the validation process is performed without the use of the character element 60, the pattern of the identifier elements in the label itself can be read during the reading process in addition to the digital images. The pattern of the identifier elements can then be read as a further code. The validation process may be performed by reading the relative positions of the identifier elements in the label. Additionally, the character element 60 can be a text and can indicate the user which validation process might be applied to identify the label 30. Alternatively to the character element, the reference element in the matrix material may be used for the reading process and validation process in addition to the identifier elements.

The label 30 can have a thickness in the overlapping direction in the range of 0.1 mm and 5 mm. In addition, the label 30 of the first embodiment has a circular shape (see FIG. 1). However, the shape of the label 30 is not limited to a circular shape, and many other shapes can be realized for the label, e.g. square shaped, polygonal, non-polygonal, irregular or rectangular. Preferably, the label 30 comprises at least two layers, but can comprise at least three layers or any number between four and twenty layers.

Figure 2:
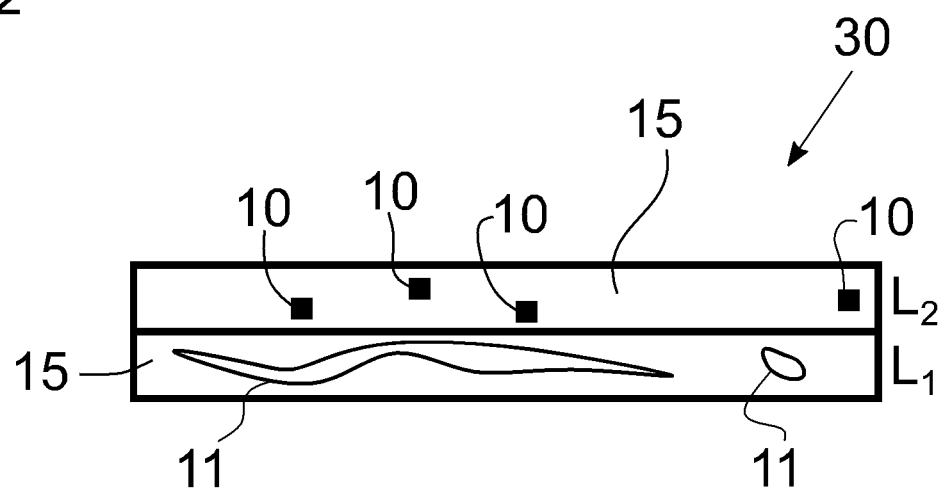
FIG. 2 shows a cross-sectional view of a label according to a second embodiment of the present invention, when viewed perpendicular to the overlapping direction.

In a second embodiment, the label 30 comprises two layers $L_1$ and $L_2$, which are arranged on top of each other so that the first layer, which is the lowermost layer of the label in the overlapping direction, is 100% overlapped by the second layer of the plurality of layers. In the first layer $L_1$, the identifier element 11 is a liquid element 11, which is surrounded by the matrix material 15. The second layer $L_2$ comprises the identifier elements 10 and the matrix material 15. In the second embodiment the liquid elements 11 are previous colored liquid that have been solidified by the matrix material 15. In particular, the liquid elements 11 are ink. The identifier elements 10 are cubic shaped metal particles or polymer particles, which are opaque and have the same color. The second embodiment is distinguished from the first embodiment that the first layer $L_1$ comprises the identifier elements 11 instead of the identifier elements 10, and that the second layer $L_2$ comprises the identifier elements 10 instead of the identifier elements 11 within the matrix material 15. In the second embodiment only two layers are described however, the label 30 can comprise more than two layers. In addition, the identifier elements 10, 11 comprises more elements than the illustrated number in the cross-section of the label in FIG. 2 when viewed perpendicular to the overlapping direction.

Figure 3:
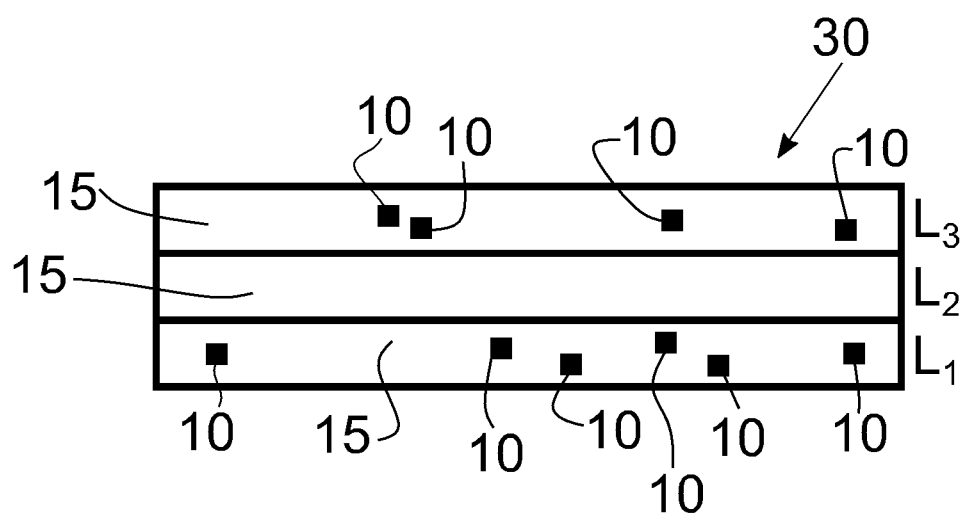
FIG. 3 shows a cross-sectional view of a label according to a third embodiment of the present invention, when viewed perpendicular to the overlapping direction.
Figure 4:
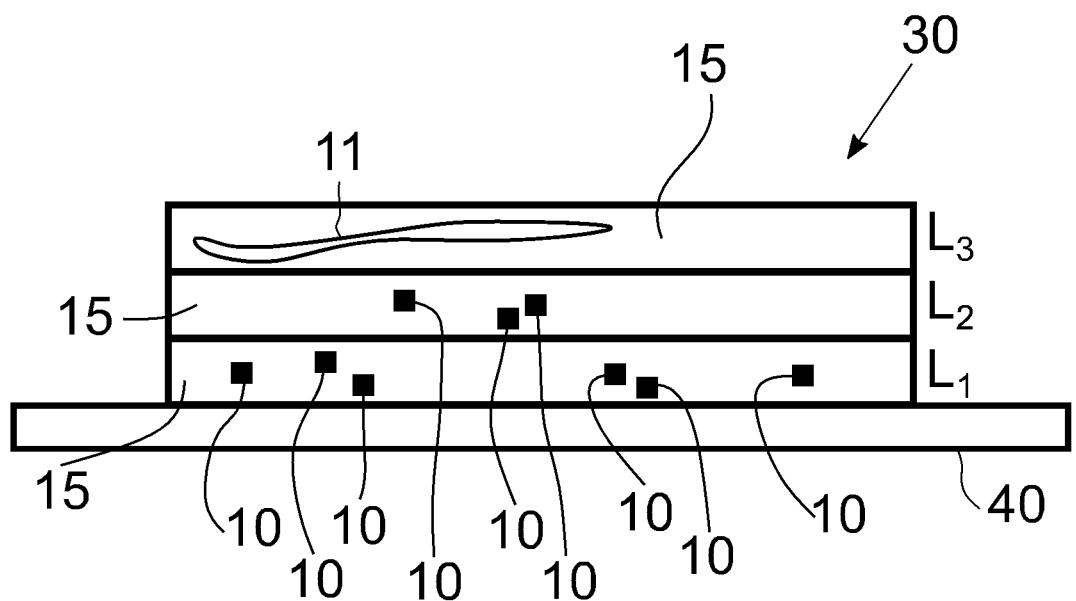
FIG. 4 shows a cross-sectional view of a label according to a fourth embodiment of the present invention with the label comprising a substrate, when viewed perpendicular to the overlapping direction.
Figure 5:
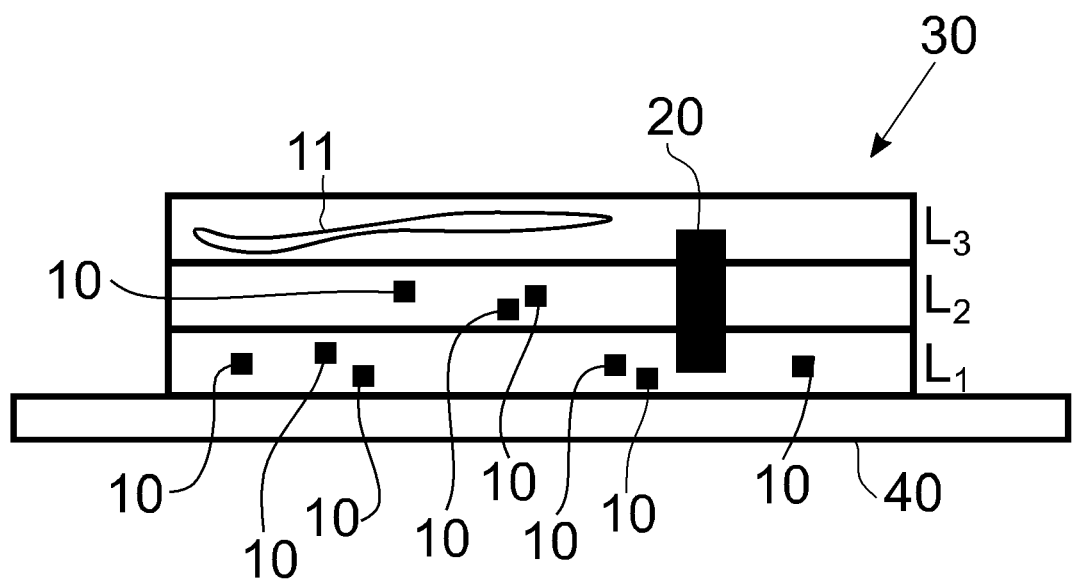
FIG. 5 shows a cross-sectional view of a label according to a fifth embodiment of the present invention with the label comprising the substrate and the reference element, when viewed perpendicular to the overlapping direction.

In a third embodiment, the label comprises three layers $L_1$, $L_2$, $L_3$ which are arranged so that all three layers are overlapping each other, i.e. all three layers are arranged congruently on top of each other. Each of the layers $L_1$, $L_3$ of the three layers $L_1$, $L_2$, $L_3$ comprises a plurality of identifier elements 10, 11 and each layer comprises the matrix material 15. The plurality of the identifier elements 10, 11 are dispersed in the matrix material 15. In this third embodiment, no further layer, such as the substrate 40 or an adhesive layer, are described or illustrated, however, the substrate 40 or a further layer can be provided. In the first and third layer L1 and L3, identifier elements 10 are cubic elements which extend in the radial direction. In FIG. 3, a cross-section of the label 30 is shown, when the label is cut by a plane which is parallel to the overlapping direction, which further shows the identifier elements 10 in a cross-section. The identifier elements 10 of the third embodiment can be made from a metal or a polymer. Even though the second layer $L_2$ of the third embodiment comprises no identifier elements, the second layer can optionally comprise identifier elements 10, 11.

The label 30 of a fourth embodiment comprises three layers $L_1$, $L_2$, and $L_3$ and the substrate 40. Each layer of the three layers $L_1$, $L_2$, and $L_3$ comprises a plurality of identifier elements 10, 11 and the matrix material 15. In the first and second layer $L_1$ and $L_2$ the first type of identifier elements 10 are distributed in the matrix material. In the third layer $L_3$, the second type of identifier elements 11 are dispersed. The three layers $L_1$, $L_2$, and $L_3$ are arranged so that all layers $L_1$, $L_2$, and $L_3$ overlap each other. However, it is possible that the three layers $L_1$, $L_2$, and $L_3$ or at least two layers of the plurality of layers at least partially overlap each other. In this embodiment, the second type of identifier elements 11 is ink, e.g. the ink can be colored in blue, red green, or any combinations thereof, and the ink is solidified in the label 30. The identifier elements 10 are solid particles, e.g. metal particles. The identifier elements 11 are mixed with the matrix material 15 inhomogeneously, so that the number of the identifier elements 11 per unit volume of the matrix material 15 change within one layer. In this embodiment, the three layers $L_1$, $L_2$, and $L_3$ are arranged on the substrate 40. The fourth embodiment is distinguished from the third embodiment by the substrate 40 and the arrangement of the plurality of layers and the distribution of the identifier elements 10,11 in each layer of the plurality of layers.

In the fifth embodiment, the label 30 comprises a plurality of layers $L_1$, $L_2$, and $L_3$, with each layer comprising a matrix material 15 and a plurality of identifier elements 10, 11. The plurality of layers $L_1$, $L_2$, and $L_3$ are arranged so that at least two layers at least partially overlap each other. In particular all three layers are arranged to overlap each to 100%. Preferably, all three layers $L_1$, $L_2$, and $L_3$ are arranged on top of each other. The fifth embodiment is distinguished from the first to fourth embodiment in that the label 30 further comprises the reference element 20. The reference element 20 is surrounded by the matrix material. The reference element can extend from the first layer $L_1$ to the third layer $L_3$. The reference element 20 has an elongated shape and can be made out of a polymer or a metal. Alternatively, the reference element 20 can extend in the radial direction of the label and can be placed in the matrix material of the second layer $L_1$ to extend in the radial direction. The reference element 20 can be a planar element or a sheet element. The reference element 20 can be a foil, a sheet, a polymer. The reference element 20 may also be placed in the third layer $L_3$.

Figure 6A:
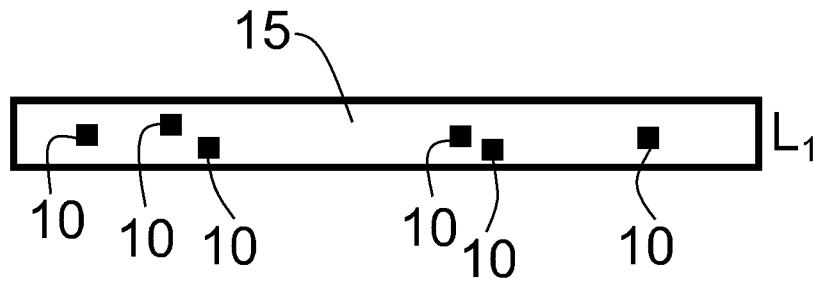
FIGS. 6A-6C show a manufacturing process of a label according to a sixth embodiment of the present invention in a cross-sectional view, when viewed perpendicular to the overlapping direction.
Figure 6B:
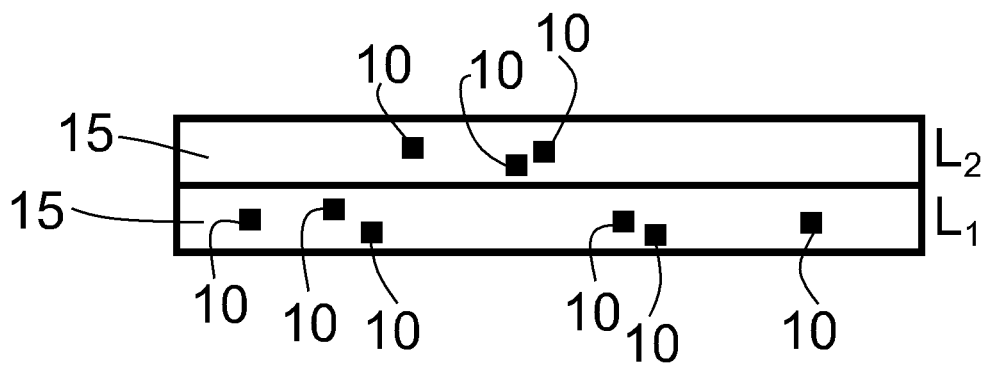
Figure 6C:
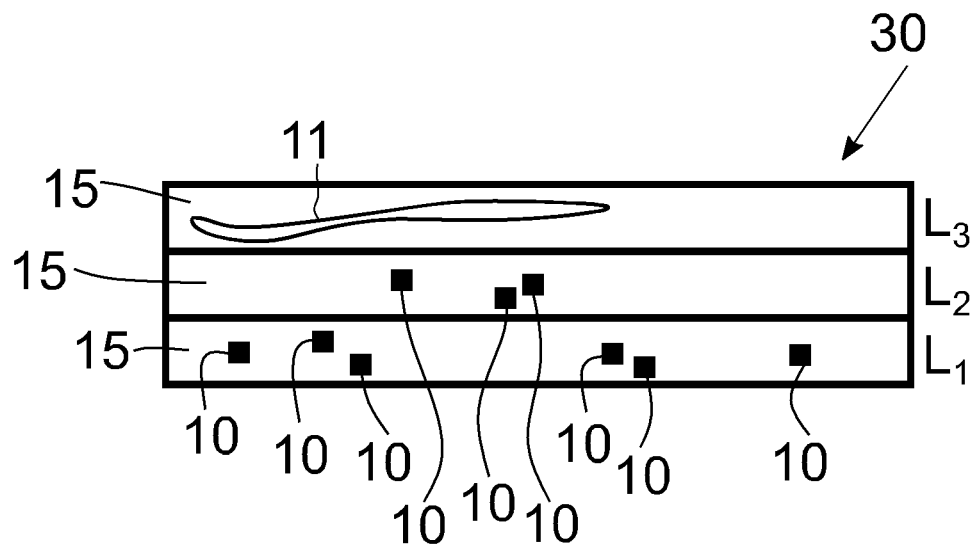

In FIG. 6A to FIG. 6C, a method of manufacturing a label according to the present invention is illustrated. Preferably, the label 30 of the third embodiment (FIG. 3) is manufactured by this method.

The method of manufacturing a label 30 for identifying an object comprises the following steps of providing at least a first mixture and a second mixture, wherein the first mixture and the second mixture each comprise a non-solid matrix material 15, in particular a liquid state, the first mixture comprises a plurality of identifier elements 10, 11, and the second mixture comprises a plurality of identifier elements 10, 11, wherein, in each mixture, the plurality of identifier elements 10, 11 are dispersed in the non-solid matrix material 15. The plurality of identifier elements 10, 11 can freely and randomly move within the non-solid matrix material 15 and can, thus, form complex structures. The identifier elements can freely distribute in the non-solid matrix material and can form natural shapes, which are irregular shapes. Afterwards the step is performed of solidifying the matrix material 15 of the first mixture so as to form a first layer $L_1$ of the label 30, and solidifying the matrix material 15 of the second mixture so as to form a second layer $L_2$ of the label 30.

In particular, the first layer $L_1$, comprising the matrix material 15 and identifier elements 10, is formed (FIG. 6A) by dispersing the identifier elements 10 in the matrix material 15, which is in a non-solid state. The non-solid state of the matrix material is a liquid state. The non-solid state of the matrix material 15 is a state where the identifier elements 15 can freely and randomly move within the matrix material 15. Optionally, the first layer can be directly formed on a surface of the object.

The second layer $L_2$ is formed on top of the first layer $L_1$. The second layer L2 comprises the matrix material 15 and the dispersed identifier elements 10, wherein the identifier elements 10 of the first layer $L_1$ and the second layer $L_2$ can be the same. The matrix material 15 of the second layer $L_2$ can be cured or solidified, after the first layer $L_1$ is cured or solidified. The second layer $L_2$ is arranged on top of the first layer $L_1$ (FIG. 6B). The second mixture of the second layer $L_2$ can be cured or solidified when the second mixture is arranged on the first layer $L_1$.

Optionally, a reference element 20 (not shown in FIG. 6A to FIG. 6C) can be placed on top of the first layer $L_1$ before the second layer $L_2$ is formed on top of the first layer $L_1$ or can be placed on top of the second layer $L_2$ before the third layer $L_3$ is formed on top of the second layer $L_1$.

The third layer $L_3$ is formed on top of the second layer $L_2$ (FIG. 6C). The third layer L2 comprises the matrix material 15 and the dispersed identifier elements 10, wherein the identifier elements 10 of the first layer $L_1$, the second layer $L_2$, and the third layer $L_3$ can be the same. The matrix material 15 of the third layer $L_3$ can be cured or solidified, after the first layer $L_1$ is cured or solidified. The third layer $L_3$ comprises the matrix material 15 and the identifier elements 11. In all three layers, the matrix material 15 can be the same material, e.g. a polymer, resin or a wax. The third layer $L_3$ is arranged on top of the second layer $L_2$ (FIG. 6C). The three layers can be cured or solidified subsequently. It is, however, possible that all three layers $L_1$, $L_2$, and $L_3$ of the label 30 can be cured at the same time. After each of the layers is cured, all three layers $L_1$, $L_2$, and $L_3$ can be additionally cured in a final step. The curing of the matrix material 15 is performed at room temperature. Additionally or alternatively, the curing of the matrix material 15 can be performed by applying a predetermined temperature and/or pressure, or by applying a UV-light. However, other curing steps may be performed, depending on the material of the matrix material 15.

Figure 7A:
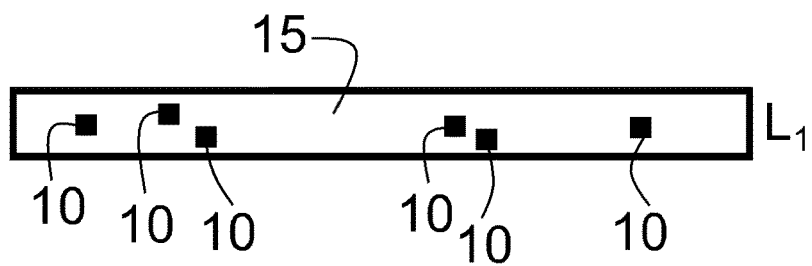
FIGS. 7A-7D show a manufacturing process of a label according to a seventh embodiment of the present invention in a cross-sectional view, when viewed perpendicular to the overlapping direction.
Figure 7B:
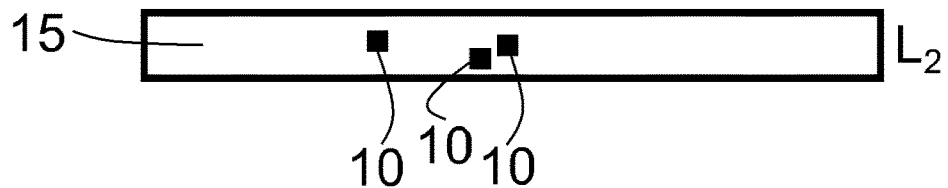

Another method of manufacturing the label 30 (FIG. 7A to FIG. 7D) according to the present invention, e.g. the label of the third embodiment (FIG. 3), comprises the method step of providing at least a first mixture (FIG. 7A), a second mixture (FIG. 7B), and a third mixture (FIG. 7C), wherein the first mixture, the second mixture, and the third each comprise a non-solid matrix material 15, in particular liquid matrix material 15, and each mixture comprises a plurality of identifier elements 10, 11, wherein, in each mixture the plurality of identifier elements 10, 11 are dispersed in the non-solid matrix material 15. Moreover, the matrix material 15 of the first mixture is solidified so as to form a first layer $L_1$ of the label 30 (FIG. 7A), the matrix material 15 of the second mixture is solidified so as to form a second layer $L_2$ of the label 30 (FIG. 7B), and the matrix material 15 of the third mixture is solidified so as to form a third layer $L_3$ of the label 30 (FIG. 7C).

The first layer $L_1$, comprising the matrix material 15 and identifier elements 10, is formed (FIG. 7A) by dispersing the identifier elements 10 in the matrix material 15, which is in a non-solid state. The non-solid state of the matrix material is a liquid state. The non-solid state of the matrix material 15 is a state where the identifier elements 15 can freely move within the matrix material 15. Optionally, the first layer can be formed on the irregular surface of the object.

The second layer $L_2$ is formed and comprises the matrix material 15 and the dispersed identifier elements 10 (FIG. 7B), wherein the identifier elements 10 of the first layer $L_1$ and the second layer $L_2$ can be the same. The matrix material 15 of the second layer $L_2$ can be cured or solidified after the first layer $L_1$ is cured or solidified.

Figure 7C:
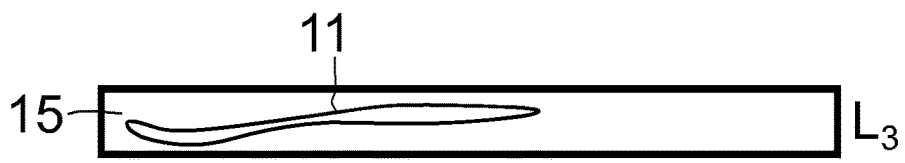
Figure 7D:
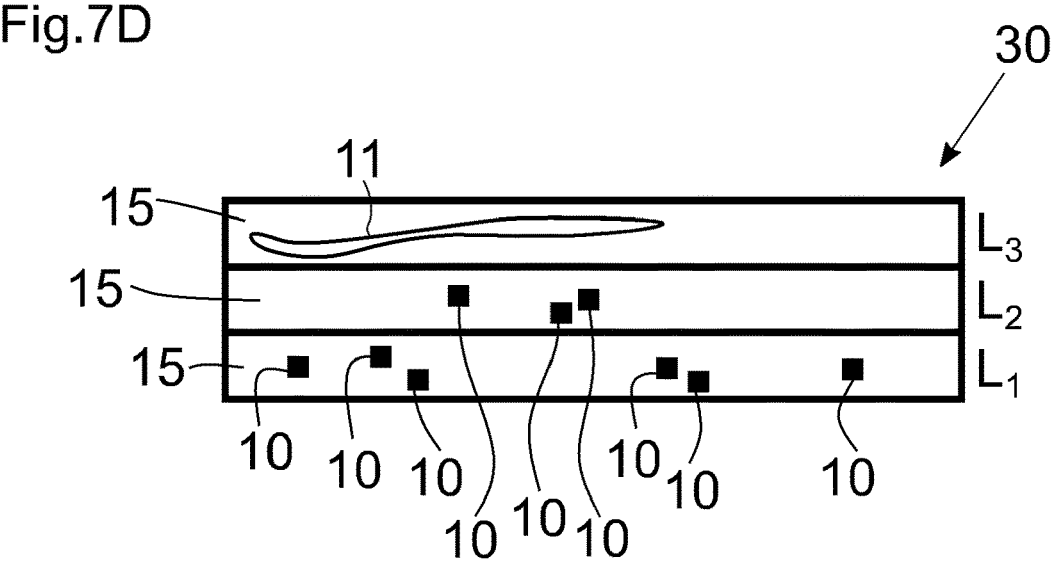

The third layer $L_3$ comprises the matrix material 15 and the identifier elements 11 (FIG. 7C). In all three layers, the matrix material 15 can be the same material, e.g. a polymer, a resin or a wax.

In other words, the first layer $L_1$ and/or the second layer $L_2$ and/or the third layer $L_3$ can be formed separately and can be arranged on top of each other, when each matrix material 15 is in a solid state.

The three layers can be cured or solidified subsequently. It is, however, possible that all three layers $L_1$, $L_2$, and $L_3$ of the label 30 can be cured at the same time. Each of the layers $L_1$, $L_2$, and $L_3$ are arranged so as to partially overlap each other, preferably on top of each other, so that the second layer is on top of the first layer and that the third layer is on top of the second layer.

After each of the layers is cured, all three layers $L_1$, $L_2$, and $L_3$ can be additionally cured in a final step. The curing of the matrix material 15 is performed at room temperature. Additionally or alternatively, the curing of the matrix material 15 can be performed under a certain temperature and/or pressure, or under UV-light. However, other curing steps may be performed, depending on the material of the matrix material 15.

Figure 8:
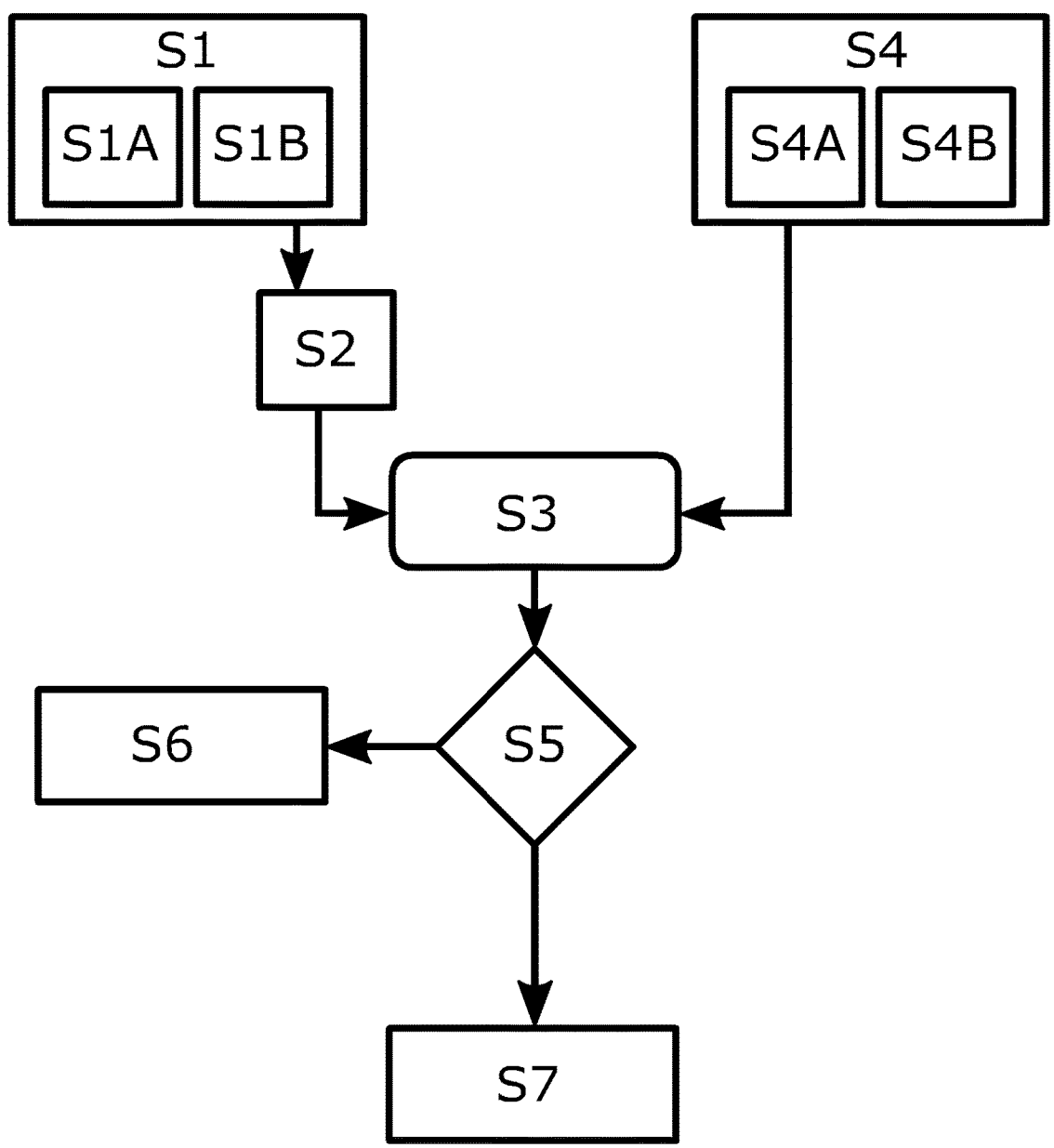
FIG. 8 shows a validation method of a label according to an embodiment of the present disclosure.

The validation process of the label 30 is described with reference to FIG. 8. A method of identifying the label for an object may comprise the steps, as illustrated in FIG. 8. In a first step S1 the manufactured label 30, e.g. the label of the previous embodiments, is read by a validation device to produce a first original digital image. The first original digital image can comprise two original digital images S1A, S1B. The two original digital images S1A, S1B are read or are determined or are scanned by a validation device in the manufactured label 30, e.g. in one focal point at two different viewing angles or at two different focal point with the same viewing angle. In a first focal point the first original digital image S1A is read or scanned. In a second focal point the second original digital image S1B is read or scanned.

By the two original digital images S1A, S1B in the first step S1, the validation device recognizes the complex pattern of the plurality of layers of the label 30 in a second step S2. In particular, the first original digital image S1A and second original digital image S1B of the label 30 are the original digital images which need to be saved in a database to be later identified. The validation device recognizes the complex pattern of the label in the second step S2 and calculates the pattern of the digital images. The complex pattern of the label may comprise the complex pattern of the identifier elements in each layer of the plurality of layers of the label, and optionally the reference element and/or the irregular surface of the substrate or object's surface in the label.

In a third step S3, the validation device stores the data of the label 30. In this third step S3, the data of the unique pattern of a plurality of layers of the label 30 is stored in a database. The storing process can be performed by a remote access to the database.

During the third step S3, additional information or data of the object, where the label is attached to or provided for can be saved in the database. While the third step S3, the label for identifying an object is placed on the object. The label for identifying an object can be placed on the object or can be directly manufactured on the object.

When the label 30 is attached or provided on an object, a user can identify the label by using the validation device.

In a fourth step S4, the user scans or reads the label 30 on an object and produces at least two control digital images S4A, S4B. However, the user could take more scans or digital images than two. The scanning or reading of the label 30 is performed by scanning or reading the label 30 at a first focal point or focal level and producing a first control digital image S4A, then the label 30 is scanned or read at a second focal point or focal level, or at a different angle by the validation device relative to the overlapping direction of the label and a second control digital image S4B is produced. On other words, the label 30 on the object is scanned by a validation device to produce a control digital image S4A, S4B. Furthermore, in the fourth step S4, the validation device computes the similarity of the scanned control digital images (e.g. unique pattern of a plurality of layers). This calculation can be based on the calculation which determines if the control digital image is identical to the original digital image. The validation device has always or in certain intervals access to a database where the original digital images of multiple labels 30 are stored. Thus, the validation device can search in the database for the original digital image of the label 30. Moreover, the validation device can access the database with the additional information of the character element 60, e.g. the serial number 60 or the text 60, to select only the one data of the original digital image. During the calculation in the fourth step S4, the digital images can be subdivided into a grid.

By the validation device in the fifth step S5, it is identified, if the control digital image S4A, S4B is similar/identical to the original digital image S1A, S2B of the label. A match is if the control digital image is nearly identical to the original digital image of a label. If there is no match between the original digital image S1A, S1B, the sixth step S6 is started, which indicates to a user of the validation device the validation device that there is no match and the label 30 is not identified, e.g. that the label is not genuine or a counterfeited.

If a match between the original digital image and the control digital image is found during the fifth step S5, this step can be repeated for every original digital image S1A,1B and for every control digital image S4A, S4B, depending on the complexity of the label or the protection levels of the label.

If a match between the original digital image and the control digital image is indicated in the fifth step S5, data is shown to the user of the validation device in a seventh step S7.

In the seventh step S7, data for identifying the object is received from the database. The data for identifying the object can be any kind of data that is connected to the complex pattern of a plurality of layers of the label 30, which is stored in the database. Moreover, through the access to the database and showing of the data, the object can be identified by the label. Additional, further information about the object can be indicated to a user, which has access.

Preferably, the original and control digital image S1A, S1B, S4A, S4B comprises two or more digital images of the label 30, with each digital image may be read from at least two different angles or directions of the label 30, with the one angle/direction being dissimilar to another angle/direction.

In another aspect, the at least two digital images of the original and control digital image may be read at least at two different focal points or focal levels within the plurality of layers of the label 30. All elements at the first focal point/level may be clear and focused in the first image. In the second image, all elements at the second focal point/level may be clear and focused. The validation is done by comparing which elements are focused in each digital image of the label 30 to be validated. Optionally, the digital images may comprise further digital images than two digital images of the label 30.

The identifier elements defined in the embodiments one to five of the label are not restricted to the described and illustrated identifier elements and can be any identifier element that is defined previously. Details or alternative of the label are not repeated for each embodiment. However, all defined combinations are possible.

While various aspects of the present invention have been described above, it should be understood that they have been presented by way of example, and not limitation. It will be apparent to persons skilled in the art that various changes in form and detail can be made therein. Thus, the present invention should not be limited by any of the above-described exemplary embodiments but is defined only in accordance with the following claims and their equivalents.

The label, precursor and methods described herein may be embodied in other specific forms without departing from the characteristics thereof. The foregoing aspects are illustrative rather than limiting of the described products and methods.

The invention claimed is:

1. A label for identifying an object, comprising:
   At least first and second layers, wherein:
   the first and second layers are arranged so that the at least two layers at least partially overlap one another;
   and further wherein:
   (a) the first layer comprises first identifier elements disposed in a first matrix material thereof, the first identifier elements being configured to be detected using visible light;
   (b) the second layer comprises second identifier elements disposed in a second matrix material thereof, the second identifier elements being configured to be detected using visible light; and
   (c) at least one of the first identifier elements and the second identifier elements comprises one or more of ink, a colored liquid, faded contours, undefined boundaries, bubbles, color streaks, smudges of color, color smears, color streaks, and flowmarks;
   and still further wherein the label comprises at least one focal point or focal mark configured to enable a validation device or a reading device to focus on the focal point or focal mark from at least two different angles using visible light, the validation device or reading device being configured to generate at least first and second digital images of at least portions of the label from the at least two different angles.

2. A label for identifying an object according to claim 1, wherein at least one of the first matrix material, the second matrix material, the first identifier elements, and the second identifier elements are selected from the group consisting of an initially solid material, an initially liquid material, and a material that is initially in a liquid state that later solidifies.

3. A label for identifying an object according to claim 1, wherein at least one of the first and second identifier elements is selected from the group consisting of an at least an initially solid element, an at least initially liquid element, and an element that is initially in a liquid state but that later solidifies.

4. A label for identifying an object according to claim 1, wherein at least one overlapping layer is transparent to visible light.

5. A label for identifying an object according to claim 1, wherein the first layer of the plurality of layers comprises the first identifier elements and the first matrix material and the second layer comprises the second identifier elements and the second matrix material, and wherein the first identifier elements are different from the second identifier elements.

6. A label for identifying an object according to claim 5, wherein the first identifier elements have a different size, color or shape, or are formed from a different material, than the second identifier elements.

7. A label for identifying an object according to claim 1, wherein the label further comprises a substrate supporting the plurality of layers.

8. A method of reading the label of claim 1, the method comprising reading the label at a first level corresponding to the first layer, and reading the label at a second level corresponding to the second layer.

9. A precursor of a label for identifying an object, the precursor comprising:
   a plurality of layers, wherein:
   each layer comprises a matrix material;
   each layer comprises a plurality of identifier elements in each layer, the plurality of identifier elements being dispersed in a corresponding matrix material and configured to be detected using visible light, and in at least one layer, the matrix material corresponding thereto is at least initially
   in a non-solid liquid state so that the identifier elements disposed therein are at least initially moveable or at least initially can disperse within the matrix material, and further wherein at least one of the first matrix material, the second matrix material, the first identifier elements, and the second identifier elements are selected from the group consisting of an initially solid material, an initially liquid material, and a material that is initially in a liquid state but that subsequently solidifies, and further wherein at least one of the first identifier elements and the second identifier elements comprises one or more of ink, a colored liquid, faded contours, undefined boundaries, bubbles, color streaks, smudges of color, color smears, color streaks, and flowmarks;
   wherein the precursor of the label comprises at least one focal point or focal mark configured to enable a validation device or a reading device to focus on the focal point or focal mark from at least two different angles using visible light, the validation device or reading device being configured to generate at least first and second digital images of at least portions of the label from the at least two different angles.

10. A precursor of a label for identifying an object according to claim 9, wherein at least a first layer of the plurality of layers comprises first identifier elements and a first matrix material, and a second layer of the plurality of layers comprises second identifier elements and a second matrix material, and further wherein the first identifier elements are different from the second identifier elements.

11. A method of manufacturing a label for identifying an object, the label comprising a plurality of layers, wherein the method comprises:

providing at least a first mixture and a second mixture;

wherein the first mixture and the second mixture each comprise at least initially a non-solid liquid matrix material;

the first mixture comprises a plurality of first identifier elements configured to be detected using visible light, and the second mixture comprises a plurality of second identifier elements configured to be detected using visible light;

wherein, in at least one of the first and second mixtures, the first or second identifier elements are dispersed in the non-solid liquid matrix material corresponding thereto and at least one of the first identifier elements and the second identifier elements comprises one or more of ink, a colored liquid, faded contours, undefined boundaries, bubbles, color streaks, smudges of color, color smears, color streaks, and flowmarks;

solidifying the matrix material of the first mixture so as to form a first layer of the label; and solidifying the matrix material of the second mixture so as to form a second layer of the label;

wherein the label further comprises at least one focal point or focal mark configured to enable a validation device or a reading device to focus on the focal point or focal mark from at least two different angles using visible light, the validation device or reading device being configured to generate at least first and second digital images of at least portions of the label from the at least two different angles.

12. The method according to claim 11, wherein the first layer and the second layer are configured so that they at least partially overlap each other.

13. The method according to claim 11, wherein the solidifying of the matrix material of the first mixture and the solidifying of the matrix material of the second mixture are performed one after the other.

14. The method according to claim 11, wherein the matrix material of the second mixture is solidified when the second mixture is arranged so as to at least partially overlap with the solidified first layer.

15. The method according to claim 11, wherein the method further comprises: arranging the first mixture and the second mixture at least partially on top of each other, and wherein the matrix material of at least one mixture is in a non- solid liquid state.

16. The method according to claim 11, wherein the method further comprises: arranging at least one of the first layer and the second layer at least partially atop the other.

17. The method according to claim 11, further comprising forming the plurality of layers on a substrate.

18. The method according to claim 11, further comprising validating or authenticating the label by reading the label using visible light to generate at least two control digital images from at least two different angles.

19. The method according to claim 18, further comprising scanning the label using visible light at the time the label is manufactured to generate the at least two control digital images.

20. The method according to claim 18, wherein the label is read by a smartphone, high-speed camera, and an optical device.

21. The method according to claim 11, wherein at least one of the first identifier elements and the second identifier elements is randomly distributed within the first matrix material and the second matrix material, respectively.

22. A label for identifying an object according to claim 1, wherein at least one of the first identifier elements and the second identifier elements are randomly distributed within the first matrix material and the second matrix material, respectively.

23. A precursor of a label for identifying an object according to claim 9, wherein at least one of the first identifier elements and the second identifier elements are randomly distributed within the first matrix material and the second matrix material, respectively.

* * * * *